United States Patent [19]

Stevens et al.

[11] 3,843,700
[45] Oct. 22, 1974

[54] ACRYLYLOXYACETYLFERROCENE AND COPOLYMERS THEREOF

[75] Inventors: Travis E. Stevens, Ambler; Samuel F. Reed, Jr., Holland, both of Pa.

[73] Assignee: The United States of America as represented by the Secretary of the Army, Washington, D.C.

[22] Filed: Jan. 3, 1973

[21] Appl. No.: 321,481

[52] U.S. Cl. ...... 260/439 CY, 149/19.9, 149/19.91, 260/83.5, 260/86.3, 260/86.7
[51] Int. Cl. .......................................... C07f 15/02
[58] Field of Search ............ 260/83.5, 86.3, 439 CY

[56] References Cited
UNITED STATES PATENTS
3,718,633   2/1973   Baldwin et al. .................. 149/19 X

*Primary Examiner*—Leland A. Sebastian
*Attorney, Agent, or Firm*—Edward J. Kelly; Herbert Berl; Jack W. Voight

[57] ABSTRACT

The preparation and copolymerization of the monomer, acrylyloxyacetylferrocene, are disclosed. The copolymerization of the ferrocene-containing monomer with a diene selected from butadiene, isoprene, and chloroprene yields copolymers for use in propellants. The copolymers are liquid compounds which are terminated with selected functional groups for curing by suitable curatives into practical propellants exhibiting high burning rates.

5 Claims, No Drawings

3,843,700

ACRYLYLOXYACETYLFERROCENE AND COPOLYMERS THEREOF

BACKGROUND OF THE INVENTION

Considerable literature exist on the preparation of polydienes to yield prepolymers having a variety of functional groups which enable curings in a solid propellant composition to be accomplished with a number of curing agents.

Ferrocene and ferrocene derivatives have been prepared and tested in propellant compositions. Both ferrocene and ferrocene derivatives furnish a source of iron for the compositions which exhibit increased burning rates. The burning rates are proportional to the iron content, but other factors can effect the burning rate. Such factors as particle size, grain design, and oxidizer-fuel ratio are some of the other factors which are most influential on the burning rate.

Since the ferrocene and ferrocene derivatives are usually in the form of liquids, plasticizing benefits are achieved. However, the ferrocene compounds of the liquid state display the inherent disadvantages characteristic of liquid additives. These disadvantages include loss by evaporation, migration, etc., and consequently, the propellant systems suffer, particularly on long term storage.

Thus, a need exists for ferrocene additives which have increased molecular weight and greater stability from evaporation or migration from a stored propellant composition.

An object of this invention is to provide a method for the preparation of a ferrocene-containing monomer that can be tailored for use in high burning rate propellant compositions.

Another object of this invention is to provide a ferrocene-containing monomer which copolymerizes with dienes to give fast-burning propellant binders.

SUMMARY OF THE INVENTION

An admixture of predetermined amounts of dimethylformamide, chloroacetylferrocene, potassium acrylate, and dichloro-dicyanobenzoquinone are reacted, in the presence of a trace amount of water, at a predetermined temperature and for a predetermined period of time to yield the ferrocene-containing monomer, acrylyloxyacetylferrocene.

Acrylyloxyacetylferrocene is copolymerized with a diene selected from isoprene, chloroprene, and butadiene to yield a copolymer which is terminated with a selected functional group (e.g., hydroxyl or carboxyl). The copolymers are liquid materials which can be processed in propellant formulations and cured by the use of suitable curatives into practical propellants exhibiting high burning rates.

DESCRIPTION OF THE PREFERRED EMBODIMENTS

PREPARATION OF ACRYLYLOXYACETYLFERROCENE, EXAMPLE I

A mixture of dimethylformamide (25 ml), water (2.5 ml), chloroacetylferrocene (2.63 g), potassium acrylate (2.2 g) and dichloro-dicyanobenzoquinone (10 mg) are heated at 80° C for 4 hours. This mixture is poured into water, and the precipitated solid (2.55 g) is removed by filtration. Recrystallization of this solid from hexane yields acrylyloxyacetylferrocene, m.p., 75°–77°.

Anal.

Calculated for $C_{15}H_{14}O_3Fe$: C, 60.43; H, 4.73; Fe, 18.73
Found: C, 60.2; H, 4.80; Fe, 19.1

The $H^1$ NMR and infrared spectra confirmed the structure of acrylyloxyacetylferrocene.

COPOLYMERIZATION WITH BUTADIENE, EXAMPLE II

To a glass high pressure reactor (Aerosol tube) is introduced 30 ml of dioxane, 2.7057 g (0.01074 mole) azo-bis-(2-methyl-5-hydroxyvaleronitrile), and 1.0 g (0.00335 mole) acrylyloxyacetylferrocene (AAF). The reactor is attached to a vacuum line and deaerated by three alternate freeze-thaw cycles. Butadiene (19.0 g, 0.352 mole) is condensed into the reactor, and the reactor transferred to an oil bath at 66-67°C. Heating is continued for a period of 72 hours. On cooling the solvent is removed by evaporation and the copolymer reprecipitated by dissolving in ether followed by the addition of methanol. After decanting the solvents, the copolymer is stripped of excess solvents on a rotatory evaporator and finally dried at 70°–75° C under reduced pressure (1 mm) for a period of 4 days (constant weight). The yield of liquid copolymer is 12.8 g (64 percent). The copolymer is characterized by molecular weight ($\overline{M}_n = 2400$), hydroxyl end groups (1.27 weight percent), and elemental analysis (percent Fe = 1.2).

Data on copolymerizations and products are shown in Table I. B/AAF means butadiene/acrylyloxyacetylferrocene.

TABLE I

| B/AAF (Weight Ratio) | Yield (%) | $\overline{M}_n$ | OH (Wt. %) | %N | %Fe Calc'd. | %Fe Found | Functionality By OH | Functionality By N |
|---|---|---|---|---|---|---|---|---|
| 19/1 | 64% | 2400 | 1.27 | 1.09 | 0.94 | 1.2 | 1.80 | 1.86 |
| 17/3 | 64% | 3100 | 1.00 | 1.04 | 2.82 | 2.9 | 1.82 | 2.30 |
| 15/5 | 73% | 2300 | 0.92 | 1.02 | 4.71 | 4.2 | 1.24 | 1.67 |
| 10/10 | 78% | 2200 | 0.62 | 0.85 | 9.41 | 9.2 | 0.80 | 1.33 |

An appropriate amount of other dienes such as isoprene, chloroprene, and the like can be substituted for butadiene in the polymerization process outlined above. The terminal groups for the copolymers prepared by the above process is carboxyl when the initiator 4,4'-azobis(4-cyanovaleric acid) is used in the method. Other free radical initiators and functionalized co-monomers can be used. The inert organic solvent can be dioxane or toluene. Numerous changes may be made in copolymer properties by changes in polymerization conditions. As exemplified in Table I, the properties of the copolymers, such as, weight percent of functional groups, the weight percent Fe, and the molecular weight can be varied by varying the weight ratio of reactants. Other changes in polymerization conditions such as time of reaction, temperature of reaction, and initiator concentration can also effect changes in copolymer properties.

The copolymers of this invention may be used as the binder-catalyst for a solid propellant composition. The copolymers may be used in the propellant composition in amounts from about 5 weight percent to about 30 weight percent. The remaining propellant ingredients exclusive of processing aids (such as lecithin) and trace amount of additives may be comprised of a plasticizer such as isodecyl pelargonate, a metal fuel such as aluminum, and an inorganic oxididzer such as ammonium perchlorate.

An example of a propellant composition using the copolymers of this invention is set forth under Example III below.

| PROPELLANT COMPOSITION, EXAMPLE III | |
|---|---|
| Ingredient | Weight Percent |
| Butadiene/acrylyloxyacetylferrocene | 10.0 |
| Isodecyl pelargonate plasticizer | 10.0 |
| Aluminum powder | 10.0 |
| Ammonium perchlorate | 70.0 |

The burning rate for the propellant formulation of Example III compared with a standard containing only polybutadiene is higher by about 20 percent. The propellant formulation of Example III does not require an additional burning rate catalyst, and the formulation may be varied to incorporate a higher binder content and a higher iron content. The burning rate of the propellant increases as the iron content increases. The iron content may also be controlled by the amount of acrylyloxyacetylferrocene copolymerized with butadiene as well as the amount of copolymer selected for use in the formulations. Those skilled in the art will recognize that the other propellant ingredients may be varied to include metal additives (e.g., aluminum powder or other powdered metals used in the art) in amounts from about 5 to about 20 weight percent, inorganic oxidizer such as, ammonium perchlorate from about 10 to about 72 weight percent. Other plasticizers may be used with the copolymers of this invention. Among the important plasticizers are nonvolatilie organic liquids or low melting solids, especially the phthalic, adipate, and sebacate esters, and aryl phosphates. Plasticizer content is determined by the desirable properties required for a propellant formulation. Generally, a plasticizer range from about 5 to about 30 weight percent is the range metting most requirements. Special processing aids such as lecithin and trace amount of additives known in the art for their specific contributions to the ballistic, castibility, and storage properties of the propellant may be added to the propellant formulation.

We claim:
1. Acrylyloxyacetylferrocene.
2. A method for preparing acrylyloxyacetylferrocene comprising reacting, in admixture and in the presence of a trace amount of water, predetermined ratio amounts of dimethylformamide, chloroacetylferrocene, potassium acrylate, and dichlorodicyanobenzoquinone; said reacting being accomplished at a predetermined reaction temperature and for a predetermined reaction time period to form a reaction product; and thereafter, separating said reaction product which is acrylyloxyacetylferrocene.
3. The method of claim 2 wherein said predeterined ratio amount of said dimethylformamide is about 25 milliliters, to about 2.63 grams of said chloroacetylferrocene, to about 2.2 grams of said potassium acrylate, and to about 10 milligrams of said dichlorodicyanobenzoquinone; said predetermined reaction temperature is about 80° C; and said predetermined reaction time period is about 4 hours.
4. A method of copolymerizing acrylyloxyacetylferrocene with a diene selected from chloroprene, isoprene, and butadiene, said method comprising:
i. reacting said acrylyloxyacetylferrocene and an initiator selected from azo-bis-(2-methyl-5-hydroxyvaleronitrile) and 4,4'azo-bis-(4-cyanovaleric acid) in an inert organic solvent with said diene at a predetermined reaction temperature and for a predetermined reaction time period sufficient for said reaction to take place to form copolymers of said acrylyloxyacetylferrocene and said diene;
ii. cooling said solvent and said copolymers and effecting solvent removal to yield the precipitated form of said copolymers;
iii. dissolving said copolymers in ether and reprecipitating said copolymers by addition of methanol; and thereafter,
iv. separating said copolymers after which drying of said copolymers is effected at a suitable drying temperature while under reduced pressure; said inert organic solvent being selected from dioxane and toluene; said reaction temperature being in the range of about 66° C to about 67° C; said reaction time period being about 72 hours; said drying being accomplished at a suitable temperature in the range of about 70°C to about 75°C; and said reduced pressure being in the range of about 1 millimeter.
5. The method of claim 4 wherein said initiator selected is azo-bis-(2-methyl-5-hydroxyvaleronitrile and wherein said reacting butadiene and acrylyloxyacetylferrocene is accomplished in weight ratios from approximately 19:1 to about 1:1 to yield said copolymers having a molecular weight in the range from about 2200 to about 3100, hydroxyend group content from about 0.6 weight percent to about 1.27 weight percent, and an iron content from about 0.94 weight percent to about 9.41 weight percent.

* * * * *